US006747938B2

(12) United States Patent
Kim

(10) Patent No.: US 6,747,938 B2
(45) Date of Patent: *Jun. 8, 2004

(54) RECORDING MEDIUM HAVING SUBSTRATE WITH THICKNESS DEPENDENT ON NUMERICAL APERTURE OF OBJECT LENS, METHOD OF FORMING THE OPTICAL MEDIUM AND OPTICAL RECORDING/REPRODUCING APPARATUS

(75) Inventor: Jin Yong Kim, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/908,807

(22) Filed: Jul. 20, 2001

(65) Prior Publication Data

US 2002/0009038 A1 Jan. 24, 2002

Related U.S. Application Data

(63) Continuation of application No. 09/334,894, filed on Jun. 17, 1999, now Pat. No. 6,345,034.

(30) Foreign Application Priority Data

Jun. 18, 1998 (KR) ............................................. 98-23005
Dec. 31, 1998 (KR) ............................................. 98-63381

(51) Int. Cl.[7] ................................................. G11B 7/00

(52) U.S. Cl. ............... 369/112.23; 369/283; 369/275.1; 369/275.2; 369/53.23; 369/118

(58) Field of Search ........................... 369/13.53, 13.39, 369/275.5, 283.118, 44.29, 44.24, 44.36, 53.23, 275.4, 275.3, 53.15, 59.24, 275.2, 112.23; 428/64.1, 64.4; 430/320, 321

(56) References Cited

U.S. PATENT DOCUMENTS

| 5,276,674 | A  |   | 1/1994  | Tanaka ..................... 369/275.3 |
| 5,838,646 | A  |   | 11/1998 | Watanabe et al. ......... 369/275.5 |
| 5,917,791 | A  |   | 6/1999  | Tsuchiya et al. .......... 369/53.23 |
| 6,040,030 | A  | * | 3/2000  | Utsunomiya et al. ...... 428/64.1 |
| 6,040,066 | A  | * | 3/2000  | Zhou et al. ................. 369/283 |
| 6,063,468 | A  | * | 5/2000  | Aratani et al. .............. 369/283 |
| 6,226,258 | B1 | * | 5/2001  | Tominaga et al. .......... 369/283 |
| 6,339,582 | B1 | * | 1/2002  | Ichihara et al. .......... 369/275.2 |

FOREIGN PATENT DOCUMENTS

| JP | 9-50647 A   | 2/1997 |
| JP | 9-204703 A  | 8/1997 |

OTHER PUBLICATIONS

Patent Abstracts of Japan, Publication No. 10–003685, Jan. 6, 1998, "Optical Pickup Device sharing CD/DVD", LG Electron Inc., Jin–Yong Kim et al.
Patent Abstracts of Japan, Publication No. 10–027364, Jan. 27, 1998, "Optical Pickup Device, Optical Reproducing Device and ojective Lens Control Method Provided with the Optical Pickup", Sony Corporation, Uchiumi Yoshimasa.
Y. Yokogawa et al., "The Path from DVD (red) to DVD (blue)", Joint Moris/Isom "97" Conference Proceeding, pp. 52 to 53.

(List continued on next page.)

Primary Examiner—Tan Dinh
Assistant Examiner—Kim-Kwok Chu
(74) Attorney, Agent, or Firm—Birch, Stewart, Kolasch & Birch, LLP

(57) ABSTRACT

A high density optical disc that can be driven changeably with the existent optical disc by the same driving apparatus. On the recording surface of the optical disc, a light transmissive layer with a thickness of about 0.2 to 0.4 mm is formed. The recording face is accessed by allowing a light beam with a wavelength of 395 to 425 nm in a spot shape to be irradiated onto it. Also, the light beam is converged in a spot shape by an objective lens having the numerical aperture of about 0.62 to 0.68.

27 Claims, 4 Drawing Sheets

OTHER PUBLICATIONS

Kiyoshi Osato et al., "A Rewritable Optical Disk System Over 10GB of Capacity", Optical Data Storage "98" Conference Edition pp. 131 to 133.

Chui Woo Lee et al., "A Compact Disc Compatible Digital Video Disc Pickup Using Annular Mask", Optical Recording Laboratory.

* cited by examiner

RECORDING MEDIUM HAVING SUBSTRATE WITH THICKNESS DEPENDENT ON NUMERICAL APERTURE OF OBJECT LENS, METHOD OF FORMING THE OPTICAL MEDIUM AND OPTICAL RECORDING/REPRODUCING APPARATUS

This is a continuation of application Ser. No. 09/334,894, filed Jun. 17, 1999, now U.S. Pat. No. 6,345,034.

BACKGROUND OF THE INVENTION

1. Field of the Invention

This invention relates to an optical recording medium for allowing an information to be accessed optically, and more particularly to an optical recording medium that is adaptive for recording information at a high density. Also, the present invention is directed to a recording and reproducing apparatus that is suitable for recording and reproducing a high density optical recording medium.

2. Description of the Related Art

The quantity of moving picture information, such as movie, has been reduced sharply in accordance with developments of digital picture processing techniques and moving picture compression techniques. For instance, analog video signals for two hours structured by a national television system committee (NTSC) system or a Phase alternating by line (PAL) system have an information amount of approximately 80 Gbytes, whereas digital video signals for two hours compressed by "MPEG-2", which is a moving picture compression standard suggested by the moving picture expert group, have an information amount of approximately 15 Gbytes. As video signals become compressed to have such a small information amount, an optical recording medium, such as compact disc (CD) or digital versatile disc (DVD), also has been required to store about two hours worth of digital video signal information.

Meanwhile, an example of an optical recording medium having the largest recording capacity includes a DVD. Beam spots irradiated onto signal tracks of the DVD must have such a size that can minimize cross-talk caused by adjacent signal tracks. To this end, an optical system for recording and reproducing the DVD includes a semiconductor laser for generating a red laser beam with a wavelength of 650 nm, and an objective lens with a numerical aperture of 0.6. A DVD recorded using such an optical system is not suitable for recording two hours of moving picture information because only up to 4.7 Gbytes can be recorded.

In order to enlarge a recording capacity, there has been discussed a scheme of using a blue laser beam having a shorter wavelength than a red laser beam. A blue laser for generating such a blue laser beam will be commercially available soon in accordance with a development of GaN group laser. It has been known that this blue laser generates a laser beam with a wavelength of about 400 nm. An optical pickup including the blue laser can access an optical recording medium for blue laser, hereinafter referred to as "HD (high density)-DVD", as well as an existent DVD. To this end, assuming that the HD-DVD have a substrate (i.e., light transmission layer) thickness of 0.6 mm (equal to that of the existent DVD) and that an optical pickup having a blue laser (hereinafter referred to as "blue laser pickup") uses an objective lens with the numerical aperture of 0.6, because a diameter of beam spots irradiated onto a disc by the blue laser pickup has a dimension proportional to $(\lambda/NA)^2$, the HD-DVD has 2.51 times the recording density of the conventional DVD. In other words, when the HD-DVD is manufactured in a form identical to the existent DVD, but has a recording capacity of 4.7 GB×2.51=11.8 GB.

Further, the blue laser pickup has an average optical aberration amount smaller than Marchel's criterion of 0.07% so as to provide beam spots within a diffraction limit and an excellent signal-to-noise ratio (S/N). The average optical aberration amount is significant when it is given in a unit of wavelength, and which includes a spherical aberration, a comma aberration, a astigmatism and so forth. It has been known that such an average optical aberration amount is influenced by a comma aberration amount, which is inversely proportional to a wavelength ($\lambda$) of the beam. The comma aberration amount appears because of disc tilt, and is proportional to "$t \cdot (NA)^3/\lambda$". In other words, the average optical aberration amount increases in accordance with a tilt amount of the disc. Accordingly, when the blue laser pickup has a tilt margin of ±0.6, which is equal to the existent optical pickup for DVD, the HD-DVD can not have the above-mentioned recording capacity. This is caused by the increased comma aberration caused by the decreased wavelength of the blue laser beam. For example, when a wavelength ($\lambda$) of the blue laser beam is 410 nm; the numerical aperture (NA) of an objective lens is 0.6; and a thickness (t) of a disc substrate is 0.6 mm, a recording capacity of the HD-DVD is reduced to approximately 8 to 9 GB.

As described above, it is difficult for an optical recording medium to have a recording capacity of 15 GB when using the blue laser. In order to solve this problem, there has been attempted a scheme of reducing a track pitch or a pit length. Various new control techniques have been applied so as to realize such a scheme. An example of the new control technique is described in a paper entitled "The path from DVD (red) to DVD (blue)" (JOINT MORIS/ISOM '97 Conference Proceeding pp. 52 to 53). In the paper, there is disclosed a scheme of carrying out a dynamic servo in accordance with a radial tilt angle to correct aberration and to raise recording density. However, if a tilt angle of a disc is generated in a radial direction, the same extent of tilt angle is generated in a tangential direction. Particularly, in the case of a disc having a serious surface vibration, the radial and tangential tilt angles become larger. Accordingly, an aberration correction through a tilt in the tangential direction is not made by carrying out only a dynamic servo in a radial direction.

An alternative technique for enlarging the recording density of an optical recording medium is described in a paper entitled "A rewritable optical disk system over 10 GB of capacity" (Optical Data Storage '98 Conference Edition pp. 131–133). This paper suggests a scheme of enlarging a recording density by raising the numerical aperture (NA) of an objective lens. As described in this paper, as the numerical aperture (NA) of an objective lens increases, a tilt margin of disc becomes enlarged. Also, in order to assure the tilt margin of the disc, a thickness (t) of the disc substrate must be reduced. For example, when the numerical aperture (NA) is set to 0.85, the disc substrate has a thickness of 0.13 mm in which a comma aberration amount ($t(NA)^3/\lambda$) becomes approximately 1 so as to secure the tilt margin of the disc. According to the above-mentioned paper in which a thickness (t) of the disc substrate is set to 0.1 mm and the numerical aperture (NA) of an objective lens is set to 0.85, a HD-DVD capable of assuring 5.04 times the recording capacity of the existent DVD is provided. Moreover, the paper considers a reduced value caused by a comma aberration margin, a defocusing aberration margin and a spherical aberration margin, including a margin of substrate thickness, etc., and the paper states a HD-DVD having a recording capacity of about 20 Gbytes can be provided. However, the scheme disclosed in the paper has a problem in that the substrate thickness becomes very thin, about 0.1 mm. Further, a disc surface is weakened by dust and scratches, etc. due to this thin substrate. Also, an objective lens having the numerical aperture of 0.85 must not only combine two lenses, due to a difficulty in its manufacture, but also requires too short a working distance from the lens to the disc surface. It is further noted that a HD-DVD having a substrate thickness of 0.1 mm is required to configure a blue laser pickup capable of changeably accessing the existent DVD of 0.6 mm as well as a CD of 1.2 mm.

SUMMARY OF THE INVENTION

Accordingly, it is an object of the present invention to provide a high density optical recording medium that is capable of being driven changeably with the existent optical disc with the same driving apparatus.

Further object of the present invention is to provide an optical recording/reproducing apparatus that is adapted to access compatibly with the existent optical recording medium and the high density optical recording medium.

Still further object of the present invention is to provide an optical recording/reproducing apparatus that is adapted to access compatibly with the high density optical recording medium and the existent optical recording medium using the same driving apparatus.

In order to achieve these and other objects of the invention, an optical recording medium according to an aspect of the present invention includes at least one substrate having a thickness between 0.2~0.4 mm and at least one recording surface. The optical recording medium is suitable for recording/reproducing information by irradiating a laser beam at a wavelength between 395~425 nm onto the recording surface of the optical recording medium. The laser beam is incident on the substrate side of the optical recording medium through an objective lens having a numerical aperture of 0.62~0.68.

An optical recording medium according to another aspect of the present invention includes at least one substrate and at least one recording surface. The optical recording medium is suitable for recording/reproducing information by irradiating a laser beam at a wavelength between 395~425 nm onto the recording surface of the optical recording medium. The laser beam is incident on the substrate side of the optical recording medium through an objective lens. The substrate and objective lens have respectively a thickness and a numerical aperture derived form an equation as follows, $$0.07(\lambda) \leq WFErms = \frac{t}{2} \frac{(n^2-1)\sin\theta\cos\theta}{(n^2-\sin^2\theta)^{\frac{3}{2}}}(NA)^3 \times \frac{1}{6\sqrt{2}}$$

Wherein, "θ" and "t" are a tilting angle and thickness of the optical recording medium and "NA" represents the numerical aperture of the objective lens.

An optical recording/reproducing method according to still another aspect of the present invention conducts recording/reproducing of information by irradiating a laser beam at a wavelength between 395~425 nm onto a recording surface of an optical recording medium. The optical recording medium consists of at least one substrate and at least one recording surface. The substrate has a thickness of 0.2~0.4 mm. The laser beam is incident on the substrate of the optical recording medium through the objective lens having a numerical aperture of 0.62~0.68.

An optical recording/reproducing apparatus according to still another aspect of the present invention includes at least one laser beam source irradiating the laser beam at a wavelength between 396~425 nm onto a recording surface of an optical recording medium and an objective lens for focusing the laser beam onto the optical recording medium. The optical recording/reproducing apparatus conducts recording/reproducing for information by irradiating the laser beam onto the recording surface of the optical recording medium. The optical recording medium has at least one substrate and at least one recording surface. The substrate has a thickness of 0.2~0.4 mm and the objective lens has a numerical aperture of 0.62~0.68.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
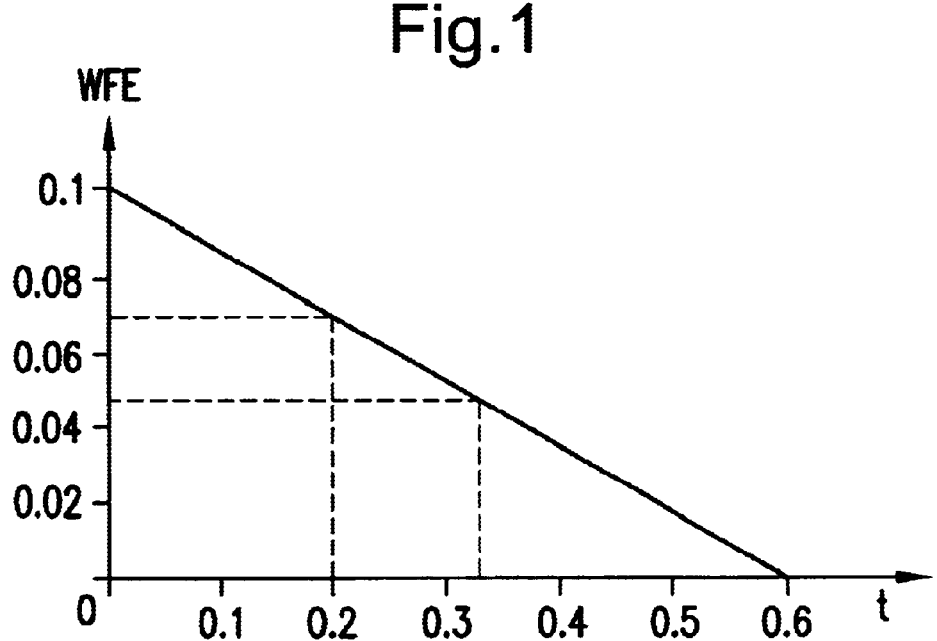
FIG. 1 is a characteristic diagram showing a relationship of a spherical aberration to a disc substrate thickness.

Prior to describing embodiments of the present invention, a substrate thickness of a HD-DVD according to the present invention allowing a blue laser optical pickup to changeably access both the existent DVD and the HD-DVD will be contemplated. In order to allow a blue laser optical pickup to access the HD-DVD as well as the existent DVD, an average optical aberration amount must be smaller than the Marchel's Criterion value of 0.07λ. To this end, an additional spherical aberration amount used for a calculation of the average optical aberration amount must be less than 0.07. The additional spherical aberration amount is generated by a substrate thickness difference between the DVD and the HD-DVD. Assuming that a substrate thickness difference between the existent DVD and a HD-DVD according to the present invention is Δt, an additional spherical aberration amount (Wspr(r)) produced at a certain position on the objective lens by the substrate thickness difference (t is given by the following formula:

$$Wsprs(r) = \frac{1}{8} \frac{\frac{n^2-1}{n^3} \Delta t(NA)^4}{\lambda} r^4 \qquad (1)$$

wherein "n" represents a refraction index; "NA" is the numerical aperture of the objective lens; and "r" is a distance from the center of the objective lens to a certain position at which a light passes. The "r" is a value normalized by the numerical aperture (NA) of the objective lens. A position where r=1 corresponds to a radius of a circle limited by the clear aperture. The additional spherical aberration (Wspr(r)) at the certain position is normalized by a wavelength ($\lambda$). If a substrate thickness of a HD-DVD designed for an original objective lens is "t" and a substrate thickness difference between the DVD and the HD-DVD is "(t", then a spherical aberration emerges even when an additional spherical aberration Wspr(r) at a certain position on the objective lens is minimized by a focusing adjustment of the objective lens. Such a spherical aberration is called "a residual spherical aberration at a certain position on the objective lens", which is calculated by the following formula:

$$Wspr_{rem}(r) = ar^2 - Wspr(r) \qquad (2)$$

Subsequently, residual spherical aberrations (Wspr_rem(r)) at each position of the objective lens given by the above formula (2) are integrated to thereby calculate an average value of the residual spherical aberration. Also, a square value of the residual spherical aberration is calculated by a square operation of the residual spherical aberrations (Wspr_rem(r)) at each position on the objective lens. A spherical aberration (Wrms) is given by making a root mean square operation of the average values of the residual spherical aberrations and the square values of each residual spherical aberration. An equation of the spherical aberration (Wrms) is expressed as follows:

$$Wrms = \sqrt{\overline{Wspr_{rem}^2} - (\overline{Wspr_{rem}})^2} \qquad (3)$$

A constant $\alpha$ allowing the spherical aberration (Wrms) to be minimized can be calculated from the given spherical aberration (Wrms). A minimum spherical aberration (WFERrms) is obtained by carrying out an operation in the equation (3) depending on this constant $\alpha$. An equation of the minimum spherical aberration (WFERrms) can be expressed as follows:

$$WFERrms = \frac{1}{6\sqrt{5}} \times \frac{1}{8} \times \frac{n^2-1}{n^3} (NA)^4 \Delta t \qquad (4)$$

Because the conventional substrate thickness is 0.6 mm, the minimum spherical aberration (WFERrms) is changed as shown in FIG. 1 in accordance with a substrate thickness (t) of the HD-DVD. Referring now to FIG. 1, the minimum spherical aberration (WEFRrms) is reduced gradually as a substrate thickness (t) of the HD-DVD increases and becomes "0" when a substrate thickness (t) of the HD-DVD is equal to that of the conventional DVD. The substrate thickness (t) of the HD-DVD must be more than 0.2 mm because such a minimum spherical aberration (WEFRrms) must be set to less than the Marchel's criterion value of 0.07$\lambda$.

Figure 2:
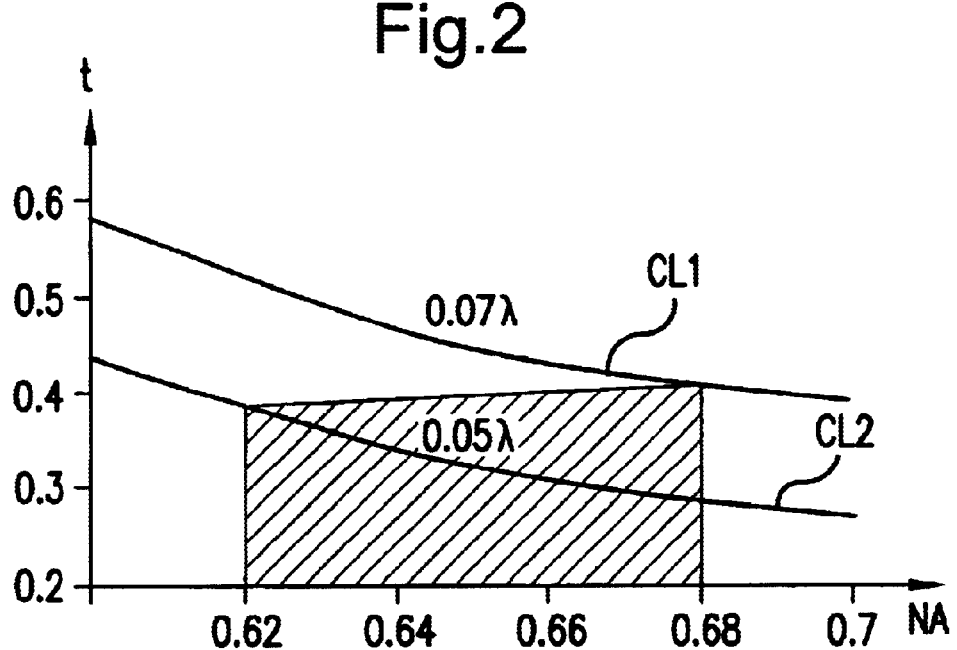
FIG. 2 is a characteristic diagram showing a relationship of the numerical aperture to a substrate thickness of disc when comma aberrations due to a disc tilt are 0.07λ and 0.05λ.

Next, a substrate thickness of the HD-DVD in consideration of a tilt affect of the disc will be described. Generally, a disc tilt occurs when a disc is accessed. Various aberrations emerge due to disc tilt. A comma aberration in these aberrations makes the largest affect on an access of the disc. The minimum comma aberration (WFECrms) is given by the following equation: 23

$$WFECrms = \frac{t}{2} \frac{(n^2-1)\sin\theta\cos\theta}{(n^2-\sin^2\theta)^{\frac{3}{2}}} (NA)^3 \times \frac{1}{6\sqrt{2}} \qquad (5)$$

wherein "$\theta$" represents a tilt angle of the disc. When the blue laser optical pickup has the same tilt margin ($\theta=\pm 0.6°$) as the conventional DVD optical pickup and, simultaneously, has a minimum comma aberration of 0.05$\lambda$, a substrate thickness (t) of the HD-DVD is reduced like the first curve (CL2) in FIG. 2 as the numerical aperture of the objective lens increases. Otherwise, when the blue laser optical pickup has the same tilt margin ($\theta=\pm 0.6°$) as the conventional DVD optical pickup and, simultaneously, has a minimum comma aberration of 0.05$\lambda$, a substrate thickness (t) of the HD-DVD is reduced like the second curve (CL2) in FIG. 2 as the numerical aperture of the objective lens increases. FIG. 2 shows that a substrate thickness of the HD-DVD must be set to below 0.45 mm assuming that the numerical aperture of the objective lens is limited to less than 0.68. In other words, when the numerical aperture of the objective lens is limited to less than 0.68, FIG. 1 and FIG. 2 indicates that the substrate thickness (t) of the HD-DVD must be set to a range larger than 0.2 mm and smaller than 0.45 mm (i.e., 0.2<t<0.45). However, a real quality of a light beam is influenced by a substrate thickness difference between the discs and aberrations due to disc tilt as well as various aberrations including an aberration in the optical pickup. Considering such various aberrations, it is desirable that, in the HD-DVD, the numerical aperture (NA) of the objective lens is set to about 0.65 and a substrate thickness (t) be set to about 0.3 mm.

Next, the numerical aperture (NA) suitable for a HD-DVD according to the present invention will be described in consideration of a tilt margin of the disc. When the minimum comma aberration (WFECrms) given by the above equation (5) is limited to less than 0.07$\lambda$ and, at the same time, the numerical aperture of the objective lens for a HD-DVD is limited to a value larger than that for a conventional DVD and smaller than 0.68, a substrate thickness (t) of the HD-DVD and the numerical aperture (NA) of the objective lens can be set to values within an oblique-line area in FIG. 2. It can be seen from FIG. 2 that a substrate thickness (t) of the HD-DVD according to the present invention is set to a range from 0.2 mm to 0.45 mm, and that the numerical aperture (NA) of the objective lens is set to a range from 0.62 to 0.68. Further, when a tilt margin of an optical pickup for a HD-DVD becomes equal to a tilt margin allowed in an optical pickup for a DVD, the substrate thickness of the disc is thinned from 0.6 mm to 0.3 mm and a wavelength ($\lambda$) of beam is shortened from 650 nm into 400 nm. Accordingly, the numerical aperture of the objective lens for a HD-DVD can be increased to NA=1.085 times the numerical aperture of the objective lens for a DVD. Since the numerical aperture of the objective lens for a DVD is 0.6, the numerical aperture of the objective lens for a HD-DVD can be set to about NA=0.6;×1.085=0.648.

Furthermore, when intending to changeably access both a HD-DVD and a DVD using a GaN group blue lager, that is, a light beam with a wavelength of 400 nm, an effective numerical aperture adaptive for the DVD will be taken into consideration. Assuming that a wavelength of a beam generated from the blue laser is λ=400 nm and a refraction index of the substrate is n=1.5, an effective numerical aperture of the objective lens, in which the minimum spherical aberration (WFErms) is 0.05, will be obtained. At this time, the size of a beam spot concentrated on the recording face of the disc must be considered along with the spherical aberration amount. The size of the beam spot concentrated on the recording face becomes proportional to λ/NA. Since a wavelength (λ) of beam applied to a DVD is 650 nm and the numerical aperture (NA) of the objective lens is 0.6, the first effective numerical aperture Naeff1 of the objective lens for a HD-DVD becomes (0.6/650)×400=0.369. Accordingly, when a DVD is reproduced using the blue laser, a DVD with a thickness of 0.6 mm is accessible, too, if the numerical aperture of the objective lens is controlled such that the first effective numerical aperture (Naeff1) of the objective lens becomes 0.369. Also, when it is intended to obtain a beam spot size for accessing a CD using the blue laser (λ=410 nm), since a wavelength (λ) of beam applied to a CD is 780 nm and the numerical aperture (NA) of the objective lens is 0.45, an effective numerical aperture (Naeff2) of the objective lens for a HD-DVD becomes 0.45×(400/780)=0.231. Accordingly, if the blue laser is used and the numerical aperture of the objective lens is controlled such that an effective numerical aperture (Naeff2) of the objective lens becomes 0.231, a CD with a thickness of 1.2 mm can be accessed by the blue laser optical pickup. For example, a control of the numerical aperture of the objective lens can be achieved by making use of a numerical aperture control device and a twin objective lens.

Figure 3:
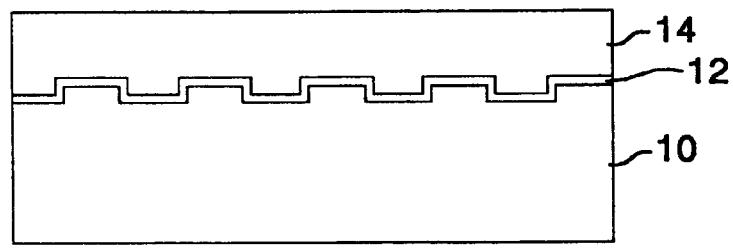
FIG. 3 is a sectional view showing the structure of an optical disc according to an embodiment of the present invention.

Preferred embodiments of the present invention will be described in detail with reference to FIG. 3 to FIG. 7. FIG. 3 is a sectional view showing the structure of a HD-DVD according to an embodiment of the present invention. The HD-DVD includes a first substrate 10 having a pit pattern defined on its surface, a reflective film 12 grown on the first substrate 10, and a second substrate 14 having a pit pattern opposed to the pit pattern defined on the first substrate 10 on its lower surface. The first substrate 10 is made from a transmissive material such as polycarbonate, etc. The pit pattern provided on the surface of the first substrate 10 is formed by an inversive transcription method. Also, the pit pattern on the first substrate 10 includes audio, text and image information, etc. In other words, the surface of the first substrate 10 provided with the pit pattern is used as a recording film. The reflective film 12 formed on the surface of the first substrate 10 reflects a light beam received by way of the second substrate 14. The second substrate 14 is bonded to the first substrate 10 in such a manner that the lower surface thereof provided with the pit pattern contacts the reflective film 12. Also, the second substrate 14 is made from a transmissive material such as polycarbonate, etc. like the first substrate 10. Such a second substrate 14 is used as a light transmissive layer. The second substrate 14 has a thickness of 0.3 mm as described above so that it is changeably used for the existent CD and DVD. The surface of the second substrate 14, which is a light transmissive layer in contact with the reflective film 12, becomes a substantial recording face. On the other hand, the first substrate 10 plays a role as a protective film for preventing a deterioration of the reflective film 12. To this end, the first substrate 10 is formed more thickly than the second substrate 14, and has preferably a thickness of 0.9 mm in such a manner that an entire thickness of the HD-DVD becomes 1.2 mm.

Figure 4:
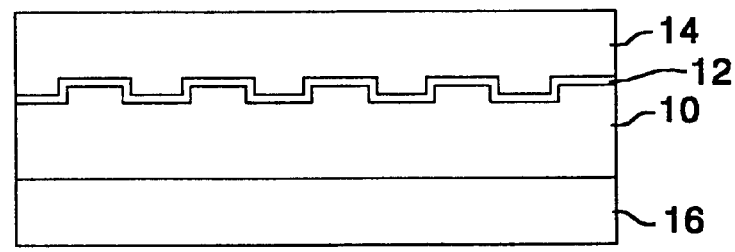
FIG. 4 is a sectional view showing the structure of an optical disc according to another embodiment of the present invention.

FIG. 4 shows the structure of a HD-DVD according to another embodiment of the present invention. The HD-DVD further includes a third substrate bonded to the lower portion of the first substrate 10 in comparison to the HD-DVD of FIG. 3. The third substrate 16 is responsible for preventing a bending deformation, etc. of the disc due to a change in a driving environment such as humidity, etc. It is desirable that the third substrate 16 is formed to a thickness of 0.3 mm equal to the second substrate 14 in consideration of symmetry with the second substrate 14. In this embodiment, the first substrate 10 is formed in a thickness of 0.6 mm such that the entire thickness of the HD-DVD becomes 1.2 mm in accordance with an addition of the third substrate 16.

Figure 5:
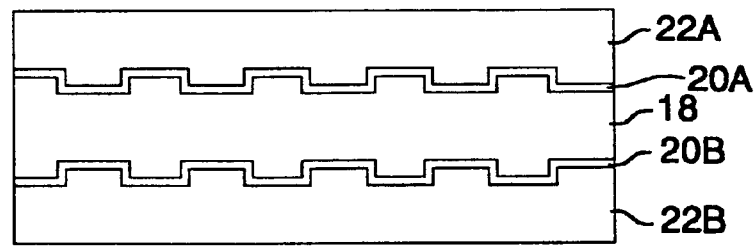
FIG. 5 is a sectional view showing the structure of an optical disc according to still another embodiment of the present invention.

FIG. 5 shows the structure of a HD-DVD according to still another embodiment of the present invention. Referring to FIG. 5, the HD-DVD includes a first substrate 18 having a pit pattern formed on each of the upper surface and the lower surface thereof, and first and second reflective films 20A and 20B grown on the upper surface and the lower surface thereof, respectively. A second substrate 20A is bonded on the first reflective film 22A while a third substrate 22B is bonded on the lower surface of the second reflective film 20B. The second substrate 22A is used as a light transmissive layer with respect to the first reflective film 20A. The second substrate 22A has a pit pattern provided at its lower surface bonded to the first reflective film 20A. The pit pattern defined on the lower surface of the second substrate 22A has a shape engagable to the pit pattern defined on the surface of the first substrate 18. Similarly, the third substrate 22B is used as a light transmissive layer with respect to the second reflective film 20B. Also, the third substrate 22B has a pit pattern provided on the surface bonded to the second reflective film 20B. The pit pattern defined on the surface of the third substrates 22A has a shape engagable to the pit pattern defined on the lower surface of the first substrate 18. Each of the second and third substrate 22A and 22B have a thickness of 0.3 mm because they are used as light transmissive layers. Accordingly, the first substrate 18 has a thickness of 0.6 mm such that the entire thickness of the HD-DVD becomes 1.2 mm.

It should be understood by an ordinary skilled person in the art that, although the embodiments of the present invention disclosed in FIG. 3 to FIG. 5 are limited to a disc of reproduction-only type, the present invention is applicable to a recordable disc. For instance, HD-DDS according to embodiments of the present invention shown in FIG. 3 to FIG. 5 further includes a recording material layer on the bonded surface among the reflective films 12 and 20 and the light transmissive layers so that it can be used as a recordable disc.

Figure 6:
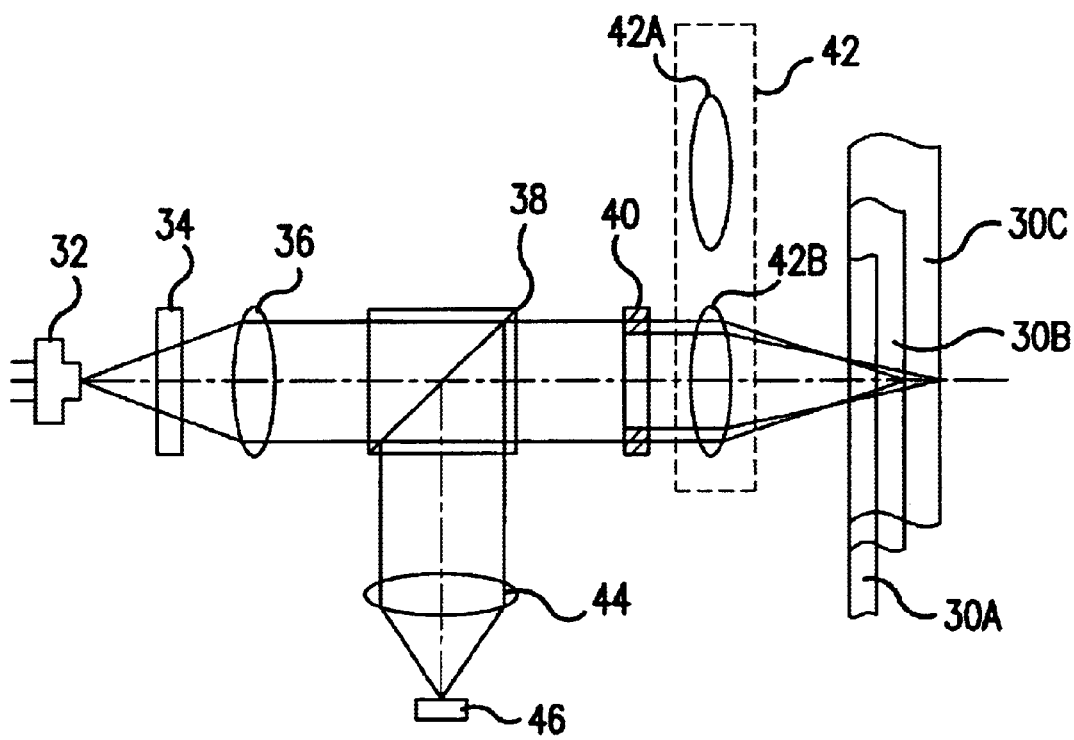
FIG. 6 is a schematic view showing the configuration of an optical recording/reproducing apparatus according to an embodiment of the present invention.

Referring now to FIG. 6, there is schematically shown a light recording/reproducing apparatus according to an embodiment of the present invention. The light recording/reproducing apparatus includes a blue laser 32 for irradiating a light beam onto a HD-DVD 30A, a DVD 30B or a CD 30C, and an objective lens part 42 for concentrating a light beam on the recording face of the HD-DVD 30A, the DVD 30B or the CD 30C. A liquid crystal panel 34, a collimator lens 36, a beam splitter 38 and a polarizing plate 40 are sequentially arranged between the blue laser 32 and an objective lens part 42. Also, the light recording/reproducing apparatus further includes a photo detector 46 for converting a light beam reflected by the recording face of the HD-DVD 30A, the DVD 30B or the CD 30C into an electrical signal, and a sensor lens 44 positioned between the beam splitter 38 and the photo detector 46. The HD-DVD 30A, the DVD 30B and the CD 30C have light transmissive layers with thickness of 0.3 mm, 0.6 mm and 1.2 mm, respectively. The blue laser 32 generates a light beam with a wavelength of 400 nm.

A light beam generated from the blue laser 32 may have characteristics of a vertical line polarization, a horizontal line polarization and a circle polarization, etc., but it is assumed to have the vertical line polarization characteristic for the sake of convenience. In other words, it is assumed that a light beam generated from the blue laser 32 is a vertical line polarizing beam. The collimator lens 36 converts a divergent light beam progressing from the blue laser 32, received via the liquid crystal panel 34, into a parallel light beam to thereby prevent a leakage of the light beam. The beam splitter 38 allows a light beam from the collimator lens 36 to progress, via the polarizing plate 40, toward the objective lens part 42, and, simultaneously, allows a reflective light beam reflected from the recording face of the HD-DVD 30A, the DVD 30B or the CD 30C to be received via the objective lens part 42, the polarizing plate 40, the sensor lens 44 by the photo detector 46. The sensor lens 44 concentrates a light beam progressing from the beam splitter 38 to the photo detector 46 on the surface of the photo detector 46, thereby preventing a leakage of a light beam. The photo detector 46 converts a reflective light beam reflected by the HD-DVD 30A, the DVD 30B or the CD 30 and then received via the objective lens part 42, the polarizing plate 40, the beam splitter 38 and the sensor lens 44 into an electrical signal. The electrical signal usually includes a servo signal and an information signal.

The objective lens part 42 includes first and second objective lenses 42A and 42B having numerical apertures (NA) different from each other. The first and second objective lenses 42A and 42B are installed at a single supporting member and selectively located on a light path by rotating the supporting member depending upon a type of optical disc. The supporting member is rotated with an actuator (not shown), and the actuator usually drives the supporting member in an axis sliding system in such a manner that the supporting member is pivoted around a rotation axis. The first objective lens 42A has the first numerical aperture (NA1), i.e., 0.65 while the second objective lens 42B has the second numerical aperture (NA2), i.e., 0.369. Also, the second numerical aperture (NA2) can be controlled into the third numerical aperture (NA3) (i.e., 0.231) mode by means of a numerical aperture control device as described later.

Figure 7:
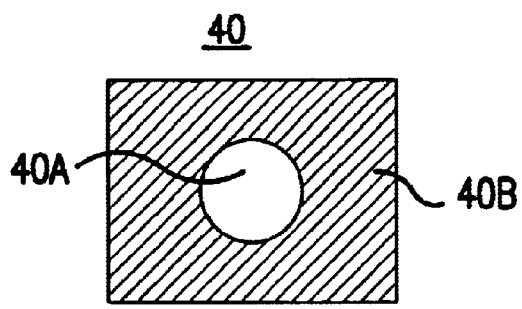
FIG. 7 is a detailed plan view of the polarizing plate shown in FIG. 6.

The liquid crystal panel 34 arranged between a light source 32 and the collimator lens 36 and the polarizing plate 40 arranged between the beam splitter 38 and the objective lens part 42 control the numerical aperture of the second objective lens 42B. The liquid crystal panel 34 is responsible for changing a polarization characteristic of a light beam depending on whether or not a voltage is applied, and selectively shuts off a portion of the light beam depending on a polarization characteristic of an incident beam. More specifically, the liquid crystal panel 34 selectively rotates a vertical polarized beam progressing from the light source 32 to the collimator lens 36 at 90°(depending on whether or not a voltage is applied. For example, when the HD-DVD 30A or the DVD 30B is accessed, a high voltage is applied to the liquid crystal panel 34. At this time, the liquid crystal panel 34 allows a vertical line polarized light beam from the blue laser 32 to be passed in a state of keeping an original polarization characteristic. On the other hand, when the CD 30C is accessed, a low voltage is applied to the liquid crystal panel 34. Then, the liquid crystal panel 34 rotates a vertical line polarized beam from the blue laser 32 at 90° and converts the same into a horizontal polarized beam. Otherwise, when a horizontal line polarized beam is generated from the blue laser 32, the liquid crystal panel 34 selectively changes a polarization characteristic of the horizontal polarized beam in accordance with a voltage contrary to the above-mentioned voltage. As shown in FIG. 7, the polarizing plate 40 includes a circular non-polarizing area 40A, and a polarizing area 40B defined around the non-polarized area 40A. The non-polarizing area 40A positioned at the center of such a polarizing plate 40 passes an incident light beam toward the objective lens 42 independently of a polarization characteristic of the incident light beam. The polarizing area 40B passes an incident light beam when a polarized direction of the light beam is identical to its polarized direction, whereas it shuts off an incident light beam when a polarized direction of the light beam is different from its polarized direction. In other words, when an incident light beam is a vertical polarized beam, that is, when the HD-DVD 30A or the DVD 30B is accessed, the polarizing area 40B passes the vertical line polarized light beam toward the objective lens part 42 as it is like the non-polarizing area 40A. On the other hand, when an incident light beam is a horizontal line polarized light beam, that is, when the CD 30C is accessed, the polarizing area 40B shuts off the horizontal line polarized light beam in a contrary manner to the non-polarizing area 40A. In this case, the non-polarizing area 40A makes the second objective lens 42B have the third numerical aperture (NA3). Also, the non-polarizing area allows the second objective lens 42B with the second numerical aperture (NA2) of 0.369 to be changed into the third numerical aperture (NA3) of 0.231.

Subsequently, a case of accessing the HD-DVD 30A, the DVD 30B or the CD 30C will be described in detail. First, when the HD-DVD is accessed, the first objective lens 42A is located at a light path and a high voltage is applied to the liquid crystal panel 34. Accordingly, a vertical line polarized beam generated from the blue laser 32 is incident to the first objective lens 42A via the liquid crystal panel 34, the collimator lens 36, the beam splitter 38 and the polarizing plate 40. This incident light beam is converged by means of the first objective lens 42A with the first numerical aperture (NA1) to thereby be irradiated onto the recording face of the HD-DVD 30A in a spot shape with a size suitable for the HD-DVD 30A. Next, when the DVD 30B is accessed, a high voltage is applied to the liquid crystal panel 34 and, at the same time, the second objective lens 42B with the second numerical aperture (NA2) is located in the light path. At this time, the second objective lens 42B is arranged in the light path by pivoting the supporting member of the objective lens part 42 with an actuator. Accordingly, a vertical line polarized light beam generated from the blue laser 32 is incident to the second objective lens 42B via the liquid crystal panel 34, the collimator lens 36, the beam splitter 38 and the polarizing plate 40. Then, the second objective lens 42B having the second numerical aperture (NA2) focuses a light beam to thereby irradiate a light beam on the recording face of the DVD 30B in a spot shape having a size suitable for the DVD 30B. Finally, when the CD 30C is accessed, a low voltage is applied to the liquid crystal panel 34 and, at the same time, the second objective lens 42B is located on a light path. Accordingly, a vertical line polarized beam generated from the blue laser 32 is incident to the polarizing plate 40 via the collimator lens 36 and the beam splitter 38 in a state changed into a horizontal line polarized beam by the liquid crystal panel 34. The horizontal line polarized beam incident to the polarizing plate 40 allows the outer portion thereof to be shut off by the polarizing area 40B and the center portion thereof to go through the non-polarizing area 40A, thereby having a reduced flux diameter. The vertical line polarized beam with the reduced flux diameter allows the second objective lens 42B to have the third numerical aperture (NA3) with an area corresponding to the non-polarizing area 40A. Accordingly, the second objective lens 42B allows a light beam to be irradiated onto the recording face of the CD 30C in a spot shape having a size suitable for the CD 30C.

As a result, a numerical value of a wavelength (λ) of a light beam corresponding to the HD-DVD 30A, the DVD 30B or the CD 30C and the numerical aperture (NA) of the objective lens can be given as indicated in the following table:

TABLE 1

|  | WAVELENGTH (λ) | NUMERICAL APERTURE |
|---|---|---|
| HD-DVD | 400 nm | 0.65 |
| DVD | 400 nm | 0.369 |
| CD | 400 nm | 0.231 |

A recording/reproducing operation can be carried out compatibly with three optical disc even when a device is configured by combining various numerical aperture control means besides the embodiment shown in FIG. 6. For instance, Korean Patent Application Nos. 98-11972, 98-11973 and 98-11974 filed by the present applicant has suggested examples of the numerical aperture control means. Alternatively, if a liquid crystal panel is combined with an annular mark, then it is possible to provide three numerical aperture modes using a single objective lens. A system employing this mark is disclosed in a paper entitled "a compact disc compatible digital video disc pickup using annular mask" ("Joint ISOM/ODS '96 Vol. 12, pp. 348–350").

As described above, the optical recording/reproducing apparatus makes use of a blue laser as a light source and is capable of controlling the numerical aperture of the objective lens into three modes, so that it can changeably record and reproduce a HD-DVD according to the present invention as well as the existent CD and DVD. Further, it should be noted that, although an optical recording/reproducing apparatus applicable changeably to all the three optical discs of HD-DVD, DVD and CD has been described as an example in the above embodiments, it is possible to construct an optical recording/reproducing apparatus applicable changeably to only two optical discs, i.e., HD-DVD and DVD; or HD-DVD and CD, etc. Meanwhile, the above-mentioned HD-DVD can assure only a capacity of 13.8 GB. Accordingly, if it is intended to extend said 13.8 GB capacity into 15 GB, then an additional capacity of 8% is required. This can be easily attained by applying a technique of eliminating a cross talk between the adjacent tracks after narrowing the track pitch by 8% or a technique of reducing a tangential ISI.

As described above, a HD-DVD according to the present invention can easily obtain the required large capacity by making use of an objective lens having a substrate thickness of 0.2 to 0.45 and the numerical aperture of 0.62 to 0.68 in correspondence with the blue laser. Further, the optical recording/reproducing method and apparatus according to the present invention controls the numerical aperture of the objective lens into 0.369 to 0.231 in accordance with the CD and DVD, so that it can perform a recording and reproducing operation changeably with the existent CD and DVD as well as the HD-DVD according to the present invention.

It should be understood to the ordinary skilled person in the art that, although a standard value of the numerical aperture corresponding to the HD-DVD, the DVD or the CD has been suggested in the present invention, an object of the present invention can be achieved even though the numerical aperture varies in a range of about 10%.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed:

1. An optical recording medium suitable for recording/reproducing information by irradiating a laser beam at a wavelength between 395~425 nm onto the recording surface of the optical recording medium, the laser beam being incident from the substrate side of the optical recording medium through an objective lens having a numerical aperture of 0.62~0.68, said optical recording medium comprising at least one substrate and at least one recording surface, said substrate having a thickness between 0.2~0.4 mm, wherein a total thickness of the optical recording medium is substantially 1.2 mm.

2. The optical medium of claim 1, further comprising:

a reflective film formed between first and second substrates of the optical recording medium.

3. The optical medium of claim 2, further comprising:

a recording material layer formed between the reflective film and the second substrate.

4. The optical medium of claim 1, wherein a first substrate of the optical recording medium has a pit pattern on a surface thereof; and a second substrate is formed over the surface of the first substrate.

5. The optical medium of claim further comprising:

a reflective film formed between the first and second substrates.

6. The optical medium of claim 1, further comprising:

a first substrate;

a second substrate; and a third substrate formed over the first substrate such that the second substrate is formed over a first surface of the first substrate and the third substrate is formed over a second surface, opposite the first surface, of the first substrate.

7. The optical medium of claim 6, wherein the third substrate has a same thickness as the second substrate.

8. The optical medium of claim 6, wherein the second substrate has a first pit pattern, and the third substrate has a second pit pattern.

9. The optical medium of claim 6, wherein the first substrate has a first pit pattern on the first surface thereof and a second pit pattern on the second surface thereof.

10. The optical medium of claim 9, further comprising:

a first reflective film formed between the first and second substrates; and a second reflective film formed between the first and third substrates.

11. The optical medium of claim 10, further comprising:

a first recording material layer formed between the first reflective film and the second substrate; and a second recording material layer formed between the second reflective film and the third substrate.

12. The optical medium of claim 10, wherein a total thickness of the first substrate, the first reflective film, the second substrate, the second reflective film, and the third substrate substantially equals 1.2 mm.

13. An optical recording/reproducing method of conducting recording/reproducing of information by irradiating a laser beam at a wavelength between 395~425 nm onto a recording surface of an optical recording medium having at least one substrate and at least one recording surface, the substrate having a thickness of 0.2~0.4 mm, said laser beam being incident on the substrate of the optical recording medium using an objective lens having a numerical aperture of 0.62~0.68, wherein a total thickness of the optical recording medium is substantially 1.2 mm.

14. An optical recording/reproducing apparatus for conducting recording/reproducing for information by irradiating a laser beam onto a recording surface of an optical recording medium having at least one substrate and at least one recording surface, and the substrate having a thickness of 0.2~0.4 mm, said optical recording!reproducing apparatus comprising at least one laser beam source irradiating the laser beam at a wavelength between 395~425 nm and an objective lens for focusing the laser beam onto the optical recording medium, said objective lens having a numerical aperture of 0.62~0.68, wherein a total thickness of the optical recording medium is substantially 1.2 mm.

15. The optical recording/reproducing apparatus as claimed in claim 14, further comprising:

numerical aperture control means for controlling the numerical aperture of the objective lens into 0.35 to 0.40, thereby recording and reproducing a second recording medium with a substrate thickness of approximately 0.6 mm.

16. The optical recording/reproducing apparatus as claimed in claim 15, wherein the numerical aperture control means controls the numerical aperture of the objective lens into about 0.24, thereby recording and reproducing a third recording medium with a substrate thickness of approximately 1.2 mm.

17. The optical recording/reproducing apparatus as claimed in claim 14, further comprising:

numerical aperture control means for controlling the numerical aperture of the objective lens into any one of 0.35 to 0.40 and about 0.24, thereby selectively recording and reproducing a second recording medium with a substrate thickness of approximately 0.6 mm and a third recording medium with a substrate thickness of approximately 1.2 mm.

18. An optical recording medium suitable for recording/reproducing information by irradiating a laser beam at a wavelength between 395~425 nm onto the recording surface of the optical recording medium, the laser beam being incident from the substrate side of the optical recording medium through an objective lens having a numerical aperture of 0.6~0.68, said optical recording medium comprising:

at least one substrate and at least one recording surface, said substrate having a thickness between 0.2~0.4 mm;
a first substrate of the optical recording medium having a pit pattern on a surface thereof;
a second substrate formed over the surface of the first substrate; and
a reflective film formed between the first and second substrates.

19. An optical recording medium suitable for recording/reproducing information by irradiating a laser beam at a wavelength between 395~425 nm onto the recording surface of the optical recording medium, the laser beam being incident from the substrate side of the optical recording medium through an objective lens having a numerical aperture of 0.62~0.68, said optical recording medium comprising:

at least one substrate and at least one recording surface, said substrate having a thickness between 0.2~0.4 mm;
a first substrate;
a second substrate; and
a third substrate formed over the first substrate such that the second substrate is formed over a first surface of the first substrate and the third substrate is formed over a second surface, opposite the first surface, of the first substrate.

20. The optical medium of claim 19, wherein the third substrate has a same thickness as the second substrate.

21. The optical medium of claim 19, wherein the second substrate has a first pit pattern, and the third substrate has a second pit pattern.

22. The optical medium of claim 19, wherein the first substrate has a first pit pattern on the first surface thereof and a second pit pattern on the second surface thereof.

23. The optical medium of claim 22, further comprising:
a first reflective film formed between the first and second substrates; and
a second reflective film formed between the first and third substrates.

24. The optical medium of claim 23, further comprising:
a first recording material layer formed between the first reflective film and the second substrate; and
a second recording material layer formed between the second reflective film and the third substrate.

25. The optical medium of claim 23, wherein a total thickness of the first substrate, the first reflective film, the second substrate, the second reflective film, and the third substrate substantially equals 1.2 mm.

26. An optical recording/reproducing apparatus for conducting recording/reproducing for information by irradiating the laser beam onto the recording surface of the optical recording medium having at least one substrate and at least one recording surface, and the substrate having a thickness of 0.2~0.4 mm, said optical recording/reproducing apparatus comprising:

at least one laser beam source irradiating the laser beam at a wavelength between 395~425 nm and an objective lens for focusing the laser beam onto the optical recording medium, said objective lens having a numerical aperture of 0.62~0.68; and
numerical aperture control means for controlling the numerical aperture of the objective lens into 0.35 to 0.40, thereby recording and reproducing a second recording medium with a substrate thickness of approximately 0.6 mm.

27. The optical recording/reproducing apparatus as claimed in claim 26, wherein the numerical aperture control means controls the numerical aperture of the objective lens into about 0.24, thereby recording and reproducing a third recording medium with a substrate thickness of approximately 1.2 mm.

* * * * *